(12) United States Patent
Sarig

(10) Patent No.: US 11,123,164 B2
(45) Date of Patent: Sep. 21, 2021

(54) DENTAL PROSTHETIC

(71) Applicant: MIS IMPLANTS TECHNOLOGIES LTD., MP Misgav (IL)

(72) Inventor: Dror Sarig, M.P. Misgav (IL)

(73) Assignee: MIS Implants Technologies Ltd., MP Misgav (IL)

( * ) Notice: Subject to any disclaimer, the term of this patent is extended or adjusted under 35 U.S.C. 154(b) by 0 days.

(21) Appl. No.: 15/574,808

(22) PCT Filed: May 10, 2016

(86) PCT No.: PCT/IL2016/050493
§ 371 (c)(1),
(2) Date: Nov. 16, 2017

(87) PCT Pub. No.: WO2016/185462
PCT Pub. Date: Nov. 24, 2016

(65) Prior Publication Data
US 2018/0140396 A1    May 24, 2018

(30) Foreign Application Priority Data

May 17, 2015   (IL) .......................................... 238862

(51) Int. Cl.
*A61C 13/00*       (2006.01)
*A61C 5/77*        (2017.01)

(52) U.S. Cl.
CPC ............ *A61C 13/0019* (2013.01); *A61C 5/77* (2017.02); *A61C 13/0004* (2013.01); *A61C 13/0013* (2013.01); *A61C 13/0018* (2013.01)

(58) Field of Classification Search
CPC ............ A61C 13/0019; A61C 13/0013; A61C 13/0004; A61C 13/0018; A61C 13/0022; A61C 13/0006; A61C 5/77
See application file for complete search history.

(56) References Cited

U.S. PATENT DOCUMENTS

| 4,937,928 A  * | 7/1990 | van der Zel ............. A61C 9/00 29/896.1 |
| 8,502,107 B2 | 8/2013 | Uckelmann |
| 2006/0115795 A1 * | 6/2006 | Marshall .................. A61C 5/77 433/218 |
| 2009/0025638 A1 | 1/2009 | Inoue |

(Continued)

FOREIGN PATENT DOCUMENTS

| WO | 2014/016244 | 1/2014 |
| WO | 2014/056336 | 4/2014 |

*Primary Examiner* — Nicholas D Lucchesi
(74) *Attorney, Agent, or Firm* — Rodney J. Fuller; Booth Udall Fuller, PLC

(57) ABSTRACT

A dental prosthetic comprising a pre-fabricated metal base and a crown, wherein the dental prosthetic is fabricated by a process comprising the steps of manufacturing the pre-fabricated metal base from a first metallic material, wherein the pre-fabricated metal base is dimensionally adapted to be secured to, and fitted to, an implant fixture, and fabricating the crown from a second material using a 3D printing technology, so that the crown is printed on the pre-fabricated metal base and thereby fabricating the crown fused onto the pre-fabricated metal base, and thereby obtaining the dental prosthetic.

15 Claims, 7 Drawing Sheets

(56) References Cited

U.S. PATENT DOCUMENTS

| | | | |
|---|---|---|---|
| 2009/0148816 A1* | 6/2009 | Marshall | A61C 5/77 433/223 |
| 2010/0143868 A1 | 6/2010 | Hintersehr | |
| 2012/0052186 A1 | 3/2012 | Junglas | |
| 2012/0291284 A1* | 11/2012 | Warden | A61C 13/0004 29/896.1 |
| 2014/0343706 A1 | 11/2014 | Hart | |
| 2015/0093719 A1* | 4/2015 | Beeby | A61C 13/0006 433/202.1 |

* cited by examiner

DENTAL PROSTHETIC

CROSS-REFERENCE TO RELATED APPLICATIONS

This application is the U.S. National Stage of International Application No. PCT/IL2016/050493, filed on May 10, 2016, which claims the benefit of and priority to Israeli Application No. 238862, filed on May 17, 2015, the contents of each of which are hereby incorporated by reference in their entireties.

FIELD OF THE INVENTION

The invention relates to dental prosthetics and more particularly to a dental prosthetic comprising a pre-fabricated metal base and a crown, whereas the crown is fabricated on the pre-fabricated metal base using 3D printing technology.

BACKGROUND OF THE INVENTION

Replacing a tooth may involve the surgical setting in the jaw bone of an implant fixture (e.g. a dental implant fixture). A base component, which may be fitted to the implant fixture by means of a screw, or an adhesive accommodates a crown (i.e. a dental crown) which is individually customized for the patient.

The last few years have seen a sharp rise in the use of 3D printers, specifically, powder-fusing 3D printers 3D printers based on powder bed fusion (PBF) technology, in the fabrication of dental prosthetics, and, in particular, in the fabrication of individually customized dental components, such as crowns and bridges.

U.S. application publication no. 2010143868 discloses a "Method for the precise fabrication of dental components using a sintering or selective laser melting process". The publication relates to a method for fabricating dental components. A set of geometric data is provided for the three-dimensional description of at least one desired dental component, and based on these geometric data a three-dimensional CAD model of the dental component is created. The CAD model processes the geometric data in the form of layer data to generate numerous CAD model layers which are suitable for use in a laser sintering or laser melting process. The laser sintering or laser melting process is then carried out, based on the layer data for each individual CAD model layer, and with computer assistance a powdered material is correspondingly applied in layers on a fabrication platform. Following the laser sintering or laser melting process, the body of the dental component having the resulting layered construction is transferred to a heat treatment oven, is subjected to heat treatment, and is subsequently cooled.

PCT application publication no. WO2014056336 discloses a "Bionic Tooth Implant and Preparation Method Thereof". The publication disclosed a bionic tooth implant, which comprises a titanium base, a porous titanium dioxide layer permeated with polyurethane and a polyurethane layer as bionic tooth peridontium. The porous titanium dioxide layer permeated with polyurethane is located between the titanium base and the polyurethane layer The preparation method of the implant comprises: the titanium base is treated with acid, and then micron-sized titanium dioxide powder is deposited layer-by-layer onto the surface of the titanium base using an electron beam melting technology to form a porous titanium dioxide layer; a polyurethane prepolymer is prepared; the polyurethane prepolymer is coated on the porous titanium dioxide layer, then the polyurethane prepolymer permeates into the holes of the titanium dioxide layer under vacuum conditions; a composite material is soaked in a solution of chain extender, and a catalyst is added for reaction, after the reaction is completed, the composite material is taken out and dried.

U.S. Pat. No. 8,502,107 discloses a "Method and Apparatus for Making Products by Sintering and/or Melting". The publication relates to a method for making metallic and/or non-metallic products, in particular dental products, by freeform sintering and/or melting, in which the products are fabricated layer by layer from a material that is applied layer by layer by means of a computer-controlled high-energy beam, in particular a laser or electron beam.

SUMMARY OF THE INVENTION

Aspects of the invention relate to dental prosthetics. More specifically, aspects of the invention relate to a dental prosthetic comprising a pre-fabricated metal base (a base component), which in some embodiments may be mass-manufactured using, for example, computer numerical control (CNC) machining. The dental prosthetic further comprises a crown, which, using a 3D printing technology, is fabricated on the pre-fabricated metal base, thereby fusing the crown onto the pre-fabricated metal base and thereby obtaining the dental prosthetic.

One of the main challenges in replacing a tooth is in the finishing level of the base component. The base component is adapted to be fitted to an implant fixture, and serves to attach the crown to the implant fixture. In order to prevent undesirable phenomena such as stress between the crown, the base component and the implant fixture, erosion of these components and penetration of infection (e.g.—bacteria) into interstices between the base component and the implant fixture, the base component and the implant fixture should be dimensioned and shaped to mechanically fit to each other with a minimal clearance in-between. In contrast, fabrication tolerances of the crown portion may be more relaxed.

Generally, the base portion is not individually customized to the patient and does not need to have a complex geometry. The base component may thus be mass-manufactured to tolerances of a few microns, e.g. using computer numerical control (CNC) machining, while keeping the cost of a single unit of the base component low. It is noticed though that according to some techniques, the base component may be produced in a small number of different models according to the type of the tooth that is to be replaced, the range within which the patient's jaw bone width falls, etc.

Crowns are preferably individually customized to the patient due to variances from one person to another in their oral anatomy and, in particular, in the dimensionality and shape of the teeth. Standard techniques for crown fabrication may require first obtaining a dental impression, or a scan, of the tooth that needs replacing, including the region around it. Based on the impression or the scan, the crown may then be fabricated by handiwork, possibly assisted by automated machining. Furthermore, the crown is preferably also fitted to allow it to be mounted on a base component using, for example, an adhesive or a screw. Alternatively, the crown and the base component may be fabricated from a single unit of material, with the part of the unit, intended to serve as the base component, first being fabricated (i.e. shaped) using automated machining techniques, and the crown being shaped and customized by hand.

Compared to standard crown fabrication techniques, 3D printing of crowns is much faster. Furthermore, 3D printing of crowns may be carried out mechanically and automatically, without requiring handiwork, and possibly at a lower cost. Being an additive-manufacturing (AM) process (wherein raw material is added to the manufactured article rather than removed therefrom), 3D printing may also be less wasteful than manual fabrication.

One goal of the invention is to combine 3D printing techniques and machining techniques (e.g. CNC machining) in order to produce an individually customized, high quality dental prosthetic simply, quickly and at a low cost. The dental prosthetic may comprise a base component which may be mass-manufactured and pre-fabricated at a relatively high accuracy, e.g. to a tolerance of a few microns. The crown may then be printed on the base component, possibly with lower accuracy compared to the base component, e.g. to a tolerance of a few hundreds of microns, yet being individually customized for a specific patient. The dental prosthetic accordingly provided faster, requiring less resources and as a lower cost relative to a dental prosthetic manufactured using currently known techniques.

The high accuracy to which the base component should be fabricated may render the fabrication of the dental prosthetic slow, and therefore possibly costly, as compared to printing the crown on a pre-fabricated and mass-manufactured base component. Moreover, 3D printed metallic objects are porous and therefore may have a rougher surface compared to machined part.

There is thus provided a dental prosthetic comprising a pre-fabricated metal base (a base component) and a crown. The pre-fabricated metal base may be mass-manufactured e.g. using CNC machining techniques, as employed for example in factories fabricating high quality implant fixtures and base components. The crown is printed on the pre-fabricated metal base, using 3D computer-aided design (CAD) data of the dental prosthetic, thereby substantially reducing the cost of fabricating an individually customized dental prosthetic, and meeting the above-mentioned goal.

Thus, according to one aspect of the invention, a dental prosthetic is provided, comprising a pre-fabricated metal base and a crown. In accordance with the invention, the dental prosthetic is fabricated by a process comprising the steps of:
  manufacturing the pre-fabricated metal base from a first metallic material, wherein the pre-fabricated metal base is dimensionally adapted to fit and be secured to an implant fixture;
  fabricating the crown from a second material using a 3D printing technology, so that the crown is printed on the pre-fabricated metal base;
  thereby fabricating the crown fused onto a pre-fabricated metal base and obtaining the dental prosthetic.

According to some embodiments, the 3D printing is carried out using a technology such as EBM, or DMLS, or SLS, or SLM. Machining, e.g. automated machining technology, for example milling or turning, is employed to manufacture the pre-fabricated metal base. Each of the first and second metallic material may comprises titanium, titanium alloy, a zirconium alloy, oxidized zirconium (zirconia oxide), a cobalt-chrome alloy, alumina (aluminum oxide) or a combination thereof.

The pre-fabricated metal base is fabricated to a dimensional tolerance of about 0.01 millimeter, and has a surface roughness from about Ra 0.2 microns to about Ra 0.3.

According to some embodiments, the process for obtaining the dental prosthetic may further include a step of applying a coating to the crown. According to some embodiments, the coating comprises a ceramic coating.

According to some embodiments, the pre-fabricated metal base comprises a base top having a base top surface thereon, the base top surface serving as a build platform for the crown, and the pre-fabricated metal base further comprises a base bottom comprising a connector means for securing the pre-fabricated metal base to the implant fixture. According to some embodiments, the base top surface is flat.

Herein, fusing of a first material to a second material is defined as printing of the first material onto the second material, thereby bonding the first material to the second material. A bonding of two materials accomplished by fusing, is referred to as fusion-induced bonding. Printing is defined as the process of producing a three-dimensional object by selectively and successively depositing layers of material using an Additive Manufacturing (AM) technique (for example, printing a 3D object using a 3D printer).

Certain embodiments of the present invention may include some, all, or none of the above advantages. Further advantages may be readily apparent to those skilled in the art from the figures, descriptions, and claims included herein. Aspects and embodiments of the invention are further described in the specification hereinbelow and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

Embodiments of methods and/or devices herein may involve performing or completing selected tasks manually, automatically, or a combination thereof. Some embodiments are implemented with the use of components that comprise hardware, software, firmware or combinations thereof.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION OF SOME EMBODIMENTS

The principles, uses and implementations of the teachings herein may be better understood with reference to the accompanying description and figure. Upon perusal of the description and figure present herein, one skilled in the art is able to implement the teachings herein without undue effort or experimentation.

Figure 1:
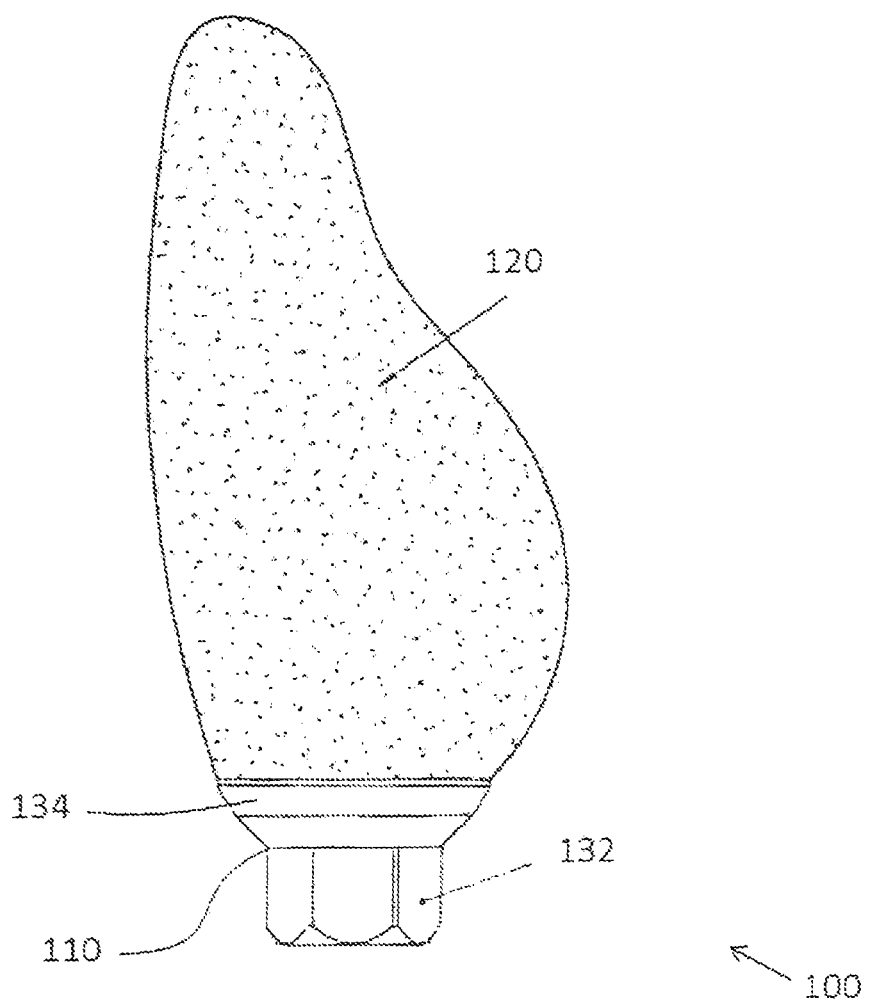
FIG. 1 schematically depicts a side-view of an embodiment of a dental prosthetic comprising a pre-fabricated metal base and a crown, according to the teachings herein.

Reference is being made to FIG. 1. An embodiment of a dental prosthetic 100, obtained by a process as described herein below, is schematically depicted in FIG. 1. Dental prosthetic 100 comprises a pre-fabricated metal base 110 and a crown 120. Pre-fabricated metal base 110 comprises a rotation preventer part 132 and a base top 134. Crown 120 is fused onto base top 134.

Pre-fabricated metal base 110 is fabricated from a first metallic material. In some exemplary embodiments, pre-fabricated metal base 110 is manufactured from a titanium-based alloy. Titanium has many desirable properties for a dental prosthetic, including biocompatibility and the ability to osseointegrate. Additionally or alternatively, pre-fabricated metal base 110 may be manufactured from titanium, a zirconium alloy, oxidized zirconium (zirconia oxide), a cobalt-chrome alloy, alumina (aluminum oxide) or a combination thereof.

Pre-fabricated metal base 110 may be manufactured in a small number of different models. The dimensions and shape of pre-fabricated metal base 110 may depend to some extent on the tooth that needs replacing and on the patient's oral anatomy, however the necessary number of different models is small. Pre-fabricated metal base 110 may therefore be mass-manufactured, e.g. using CNC machining such as CNC milling, thereby keeping the cost of a single unit of pre-fabricated metal base 110 low.

Pre-fabricated metal base 110 (in each model) is manufactured so as to be dimensionally adapted to be precisely fitted to, and strongly secured to, an implant fixture corresponding to the pre-fabricated metal base 110.

Crown 120 is fabricated using 3D printing techniques, according to 3D computer aided design (CAD), thereby allowing for individually customized rapid and low cost manufacturing. The 3D CAD data comprises a digitized three-dimensional mathematical representation of planned dimensions for crown 120, as well as other information such as a planned composition of crown 120, instructions for the printing, etc. (The higher the quality of the 3D printer, the closer a printed object's properties may be to the printed object's planned properties.)

In an exemplary embodiment, crown 120 is fabricated from a titanium alloy. In other exemplary embodiments, crown 120 may be fabricated from a variety of materials such as titanium, a zirconium alloy, oxidized zirconium (zirconia oxide), a cobalt-chrome alloy, alumina (aluminum oxide) or a combination thereof.

A process of providing a dental prosthetic according to an aspect of some embodiments may comprise a step of providing 3D CAD data specifying the planned dimensions of pre-fabricated metal base 110. The 3D CAD data may be fed into a computer numerical control (CNC) machine, such as a CNC mill. The CNC machine is then employed to produce metal base 110.

According to some exemplary embodiments, pre-fabricated metal base 110 is manufactured and produced with relatively tight tolerances and surface roughness (Ra). That is to say, pre-fabricated metal base 110 is fabricated to tolerances of about 10 microns, and to an Ra from about 0.2 microns to about 0.3. Accordingly actual dimensions of pre-fabricated metal base 110 may deviate from the planned dimensions by about ten microns at most. A tight tolerance of a about 10 microns, and a surface roughness of about Ra 0.2 to about Ra 0.3, are required in the manufacturing of pre-fabricated metal base 110 in order to prevent stress between pre-fabricated metal base 110 and the implant fixture (not shown), erosion (wear) of these components, and penetration of infections (e.g.—bacteria) into the interstices between pre-fabricated metal base 110 and the implant fixture (that is not illustrated). The implant fixture may comprise a socket (e.g. a bore) and pre-fabricated metal base 110 is therefore designed and dimensioned to have a clearance of no more than 20 microns from the socket.

Figure 2:
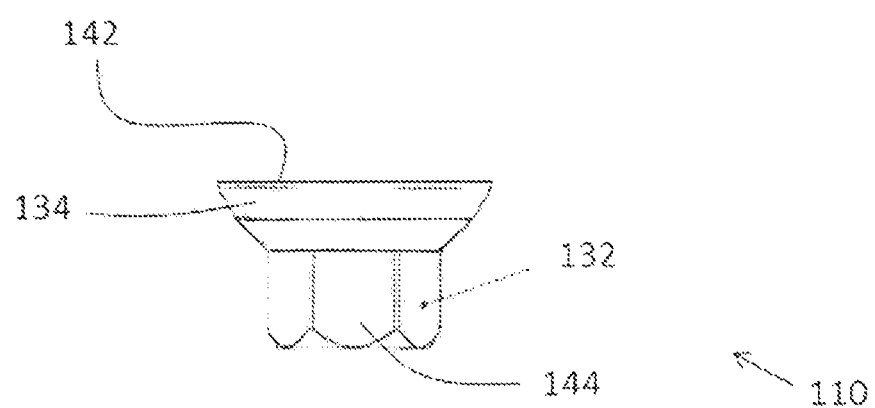
FIG. 2 schematically depicts a side-view of the pre-fabricated metal base of FIG. 1.
Figure 4:
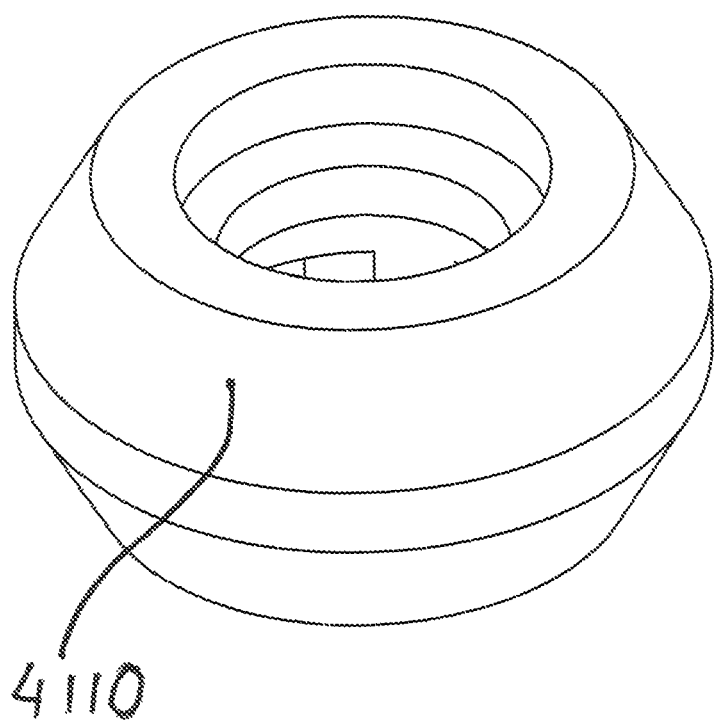
FIG. 4 schematically depicts a perspective view of another version of a pre-fabricated metal base, comprising an external hexagon type of connector means for securing the pre-fabricated metal base to the implant fixture.
Figure 5:
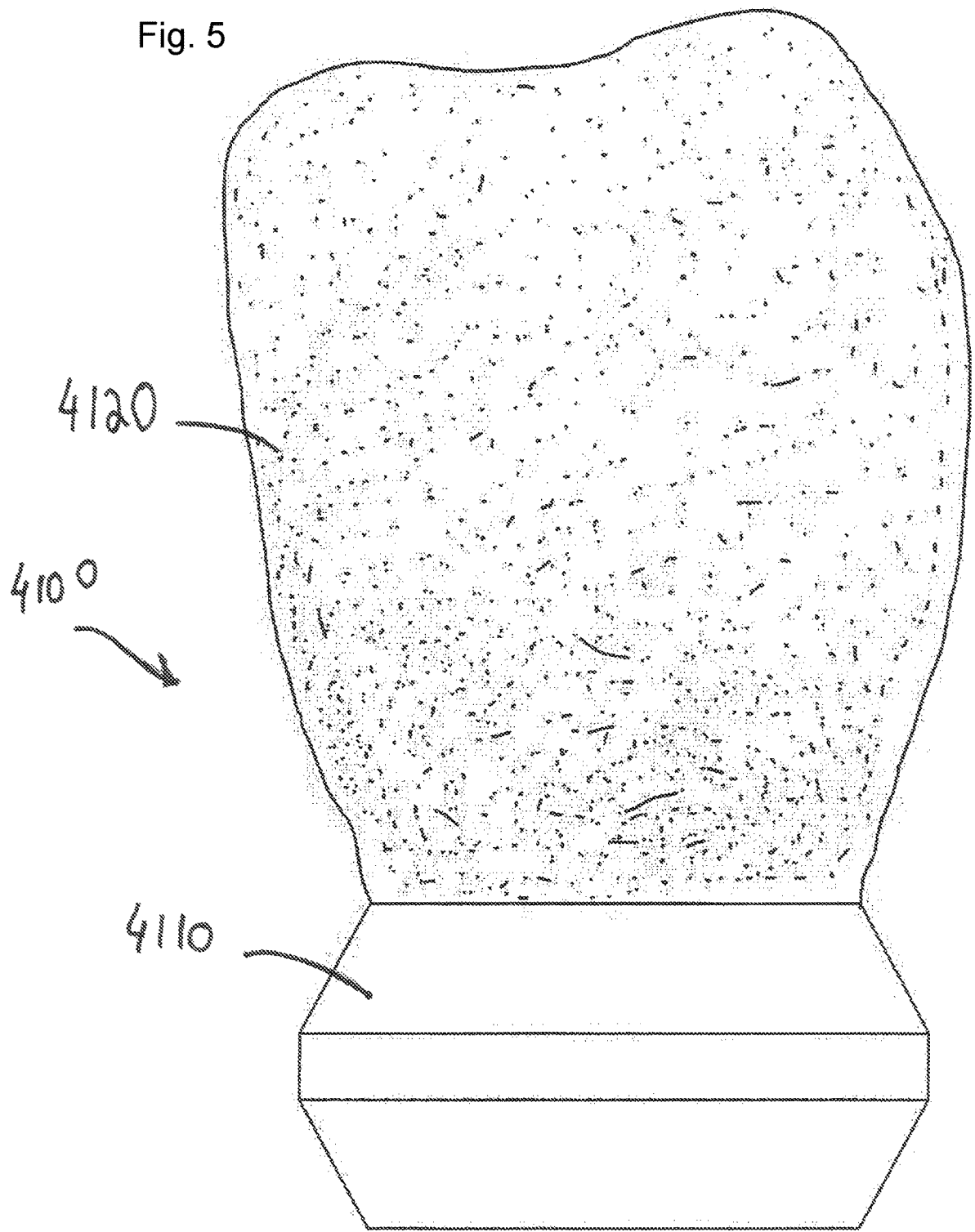
FIG. 5 schematically depicts a side-view of an embodiment of a dental prosthetic comprising the pre-fabricated metal base of FIG. 4 and a crown, according to the teachings herein.
Figure 6:
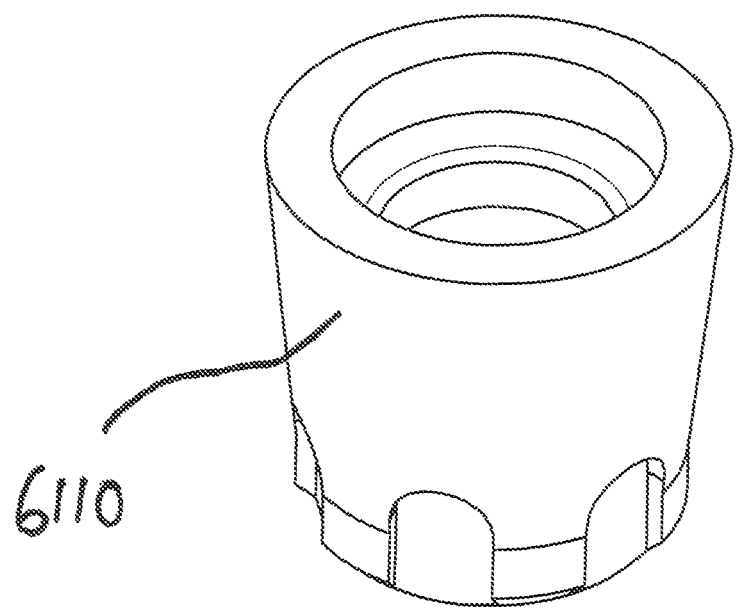
FIG. 6 schematically depicts a perspective view of another version of a pre-fabricated metal base, comprising a conical type of connector means for securing the pre-fabricated metal base to the implant fixture.
Figure 7:
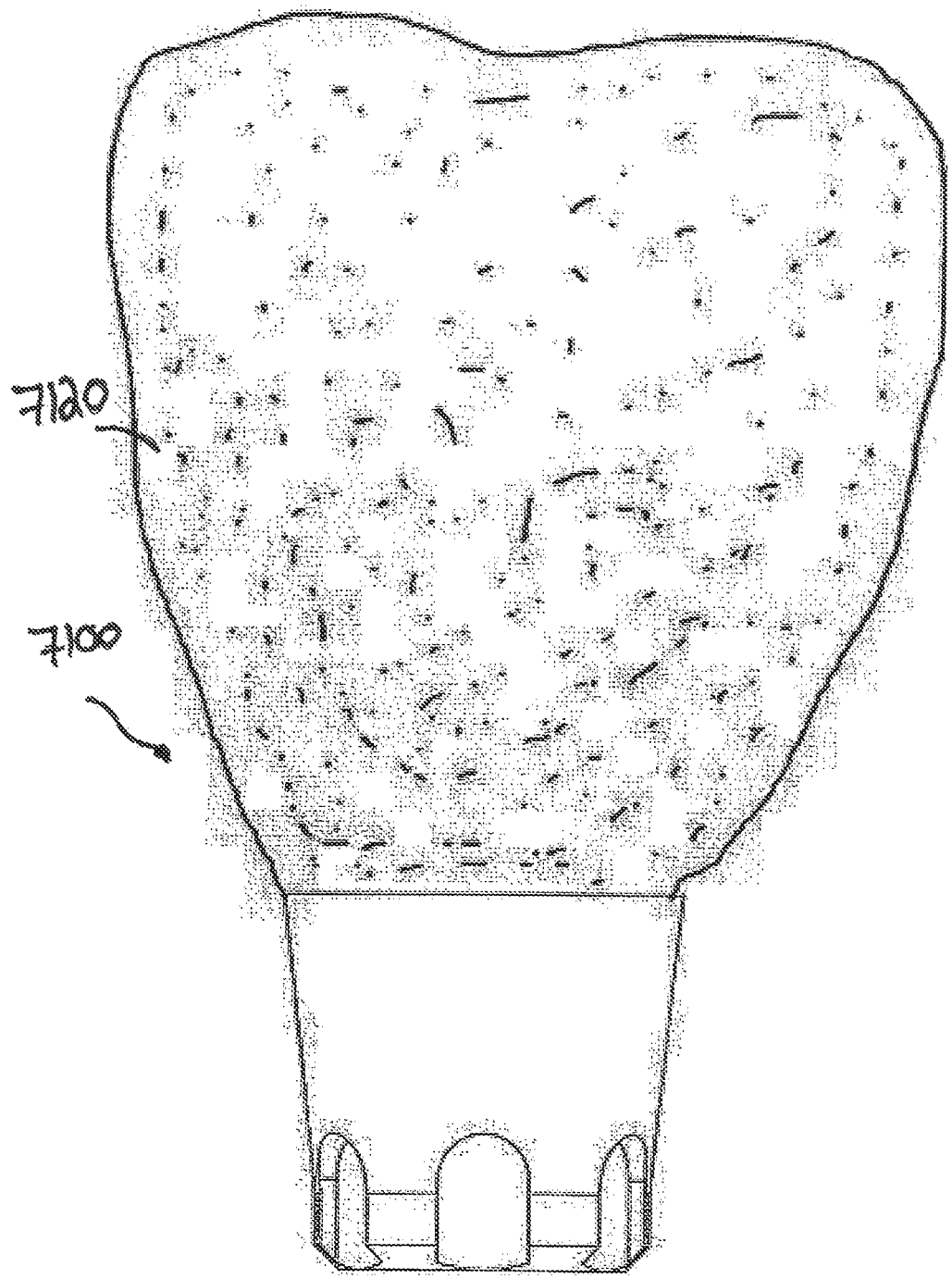
FIG. 7 schematically depicts a side-view of an embodiment of a dental prosthetic comprising the pre-fabricated metal base of FIG. 6 and a crown, according to the teachings herein.

Reference is being made to FIG. 2. The figure depict pre-fabricated metal base 110 that is formed with base top 134 that comprises a base top surface 142, which is flat and serve as a build platform for the crown (not shown). The base bottom comprise a rotation preventer part 132 as a connector means 144 for securing pre-fabricated metal base 110 to the implant fixture (not shown). The depicted connector means 144 is a multi-faceted and circumferentially hexagonal, known in the art as an internal hexagonal type of connector means but any professional will appreciate that other known connector means may be implemented (such as external hexagonal as depicted in FIGS. 4-5 and conical type of connector as depicted in FIGS. 6-7).

While referring back to the manufacturing process, the process of providing a dental prosthetic in accordance with the invention, further comprise a step of fabricating the crown 120 from a second material by printing the crown onto the pre-fabricated metal base 110. A 3D printer is employed to deposit successive layers of the second material on base top 134. 3D CAD data, representing crown 120, is provided, and as explained above, the crown 120—and hence the 3D CAD representation thereof—may be unique so as to individually fit into a specific patient's mouth.

The 3D CAD data is converted, e.g. by a computer, to a set of 2D CAD data files, representing successive layers forming crown 120. That is to say, each such 2D data file defines the dimensions and shape of one layer of the second material to be deposited to fabricate crown 120. During printing of crown 120, each of the successive layers is fused onto the previous layer, whereas the first layer is fused directly onto base top surface 142.

Figure 3:
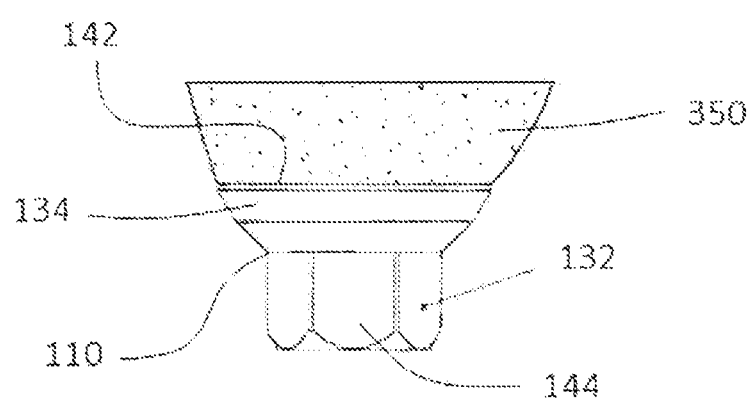
FIG. 3 schematically depicts a side-view of the dental prosthetic of FIG. 1 in the course of printing the crown on the pre-fabricated metal base, wherein the crown has not yet finished being printed.

Reference is being made to FIG. 3. FIG. 3 depicts dental prosthetic 100 during the printing of crown 120 onto pre-fabricated metal base 110, wherein only a part of crown 120 has been printed, i.e. a crown segment 350, and crown 120 has yet to finish being printed.

Printing may be accomplished using a controllably orientable and focused high-energy beam, e.g. a laser. Thus, crown 120 is fused onto pre-fabricated metal base 110, thereby fabricating dental prosthetic 100.

A powder bed fusion (PBF) technology such as EBM, DMLS, SLS or SLM is employed for printing the crown 120 onto base top 134, as is further detailed and described below. Layers of the second material, being initially provided in the form of a powder, e.g. metallic or ceramic powder, are spread successively one layer over another on base top surface 142 (FIG. 3)—which serves as a build platform for crown 120—and leveled, using for example a roller (not shown). A computer controlled high-energy beam may be used to fuse in turn each layer onto the layer below it (and the first layer onto base top surface 142). Following the fusing of a layer, pre-fabricated metal base 110 is slightly lowered and a new layer of material is spread and leveled. Unfused powder is removed once the printing is completed.

In some exemplary embodiments, electron beam melting (EBM) technology may be employed for printing the crown 120 onto base top 134. A computer-controlled electron beam may be used for fusing successive layers of the second material, being a metal or ceramic powder, onto pre-fabricated metal base 110.

In some exemplary embodiments, laser-sintering technology, i.e. direct metal laser-sintering (DMLS) and selective laser sintering (SLS, used for printing ceramics), may be employed to fuse crown 120 onto base top 134.

In some exemplary embodiments, selective laser-melting (SLM) technology, may be employed to fuse crown 120 onto base top 134.

In some exemplary embodiments, fused deposition modeling (FDM) for metals technology may be employed for printing the crown 120 onto base top 134. That is to say, successive layers of molten droplets, obtained from molten second material, may be deposited on base top 134, thereby printing crown 120 onto pre-fabricated metal base 110 and thereby fabricating dental prosthetic 100.

Reference is being made to FIG. 4 and FIG. 5. FIGS. 4 and 5 schematically depicts (respectively)—a perspective view of another version of a pre-fabricated metal base 4110, comprising an external hexagon type of connector means for securing the pre-fabricated metal base to the implant fixture and a side-view of an embodiment of a dental prosthetic 4100 comprising the pre-fabricated metal base 4110 and a crown 4120 which is fabricated using 3D printing techniques on top of pre-fabricated metal base 4110 whereas the first layer is fused directly onto the base top surface of pre-fabricated metal base 4110 according to the teachings of the invention.

Reference is being made to FIG. 6 and FIG. 7. FIGS. 6 and 7 schematically depicts (respectively)—a perspective view of another version of a pre-fabricated metal base 6110, comprising a conical type of connector means (in the depicted example—the type known in the art as MIS type of conical connector), for securing the pre-fabricated metal base to the implant fixture and a side-view of an embodiment of a dental prosthetic 7100 comprising the pre-fabricated metal base 6110 and a crown 7120 which is fabricated using 3D printing techniques on top of pre-fabricated metal base 6110 whereas the first layer is fused directly onto the base top surface of pre-fabricated metal base 6110 according to the teachings of the invention.

According to some embodiments, the process of providing dental prosthetic 100, 4100 or 7100 may comprise yet additional step—a coating may be applied (i.e. deposited onto) crown 120, 4120 or 7120. Ceramic coating may be used to coat such crowns.

Thus, there is provided dental prosthetic comprising pre-fabricated metal base, which is fitted onto an implant fixture, and crown, which is 3D printed onto pre-fabricated metal base. Using machining techniques pre-fabricated metal base may be fabricated to tolerances of about 0.01 millimeter and a surface roughness from about Ra 0.2 to Ra 0.3, thereby providing a tight fit between pre-fabricated metal base and the implant fixture.

In light of the above, a professional in the field will therefore appreciate that the invention provides a faster and cheaper method for the fabrication of dental prosthetics comprising a base component and a crown, as compared to prior art, while at the same time accomplishing the required accuracy of craftsmanship necessary in order to prevent undesirable phenomena.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

The invention claimed is:

1. A method for producing a dental prosthetic comprising:
   a. manufacturing a base by removing material through a machining process, according to a first computer-aided design (CAD) using a first dimensional tolerance value, the base comprising a flat top surface that is flat and machined, and
   b. fabricating a crown on said flat top surface of the base by adding material through successively depositing layers of material directly on said flat top surface, according to a second computer-aided design (CAD) using a second dimensional tolerance value;
   wherein the first tolerance value is smaller than the second tolerance value.

2. The method of claim 1, wherein said manufacturing of said base and said fabricating of said crown are conducted using the same material.

3. The method of claim 2, wherein said material is selected from a group consisting of titanium, titanium alloy, zirconium alloy, oxidized zirconium, cobalt-chrome alloy and a combination thereof.

4. The method of claim 2, wherein said first dimensional tolerance is about 0.01 millimeter and said second dimensional tolerance is about 0.1 millimeter.

5. The method of claim 4, further comprising fabricating a coating on said crown.

6. The method of claim 5, wherein said coating comprises a ceramic coating.

7. The method of claim 1, wherein said base comprises, in addition to said flat top surface, a bottom formed with a connector means for securing said base to an implant fixture.

8. The method of claim 7, wherein said connector means is selected from a group consisting of internal hexagonal connector, external hexagonal connector and conical type of connector.

9. The method of claim 1, wherein said depositing of said material comprises fusing the material on said flat top surface of the base using a laser and/or an electron beam.

10. The method of claim 1, wherein the first tolerance value is at least one order of magnitude smaller than the second tolerance value.

11. A method for producing a dental prosthetic comprising:

manufacturing a base by removing material through a machining process, according to a first computer-aided design (CAD) using a first dimensional tolerance value, the base comprising a flat top surface that is flat and machined; and after manufacturing the base, fabricating a crown on said flat top surface of the base by adding material through successively depositing layers of material directly on said flat top surface, according to a second computer-aided design (CAD) using a second dimensional tolerance value;

wherein the first tolerance value is about 0.01 millimeters and the second tolerance value is about 0.1 millimeters.

12. The method of claim 11, wherein said base comprises, in addition to said flat top surface, a bottom formed with a connector means for securing said base to an implant fixture.

13. The method of claim 12, wherein said connector means is selected from a group consisting of internal hexagonal connector, external hexagonal connector and conical type of connector.

14. The method of claim 11, wherein said manufacturing of said base and said fabricating of said crown are conducted using the same material.

15. The method of claim 11, wherein said depositing of said material comprises fusing the material on said flat top surface of the base using a laser and/or an electron beam.

* * * * *